Sept. 14, 1926.
O. W. BRENIZER
TOGGLE BOLT
Filed March 6, 1925
1,600,035
2 Sheets-Sheet 1
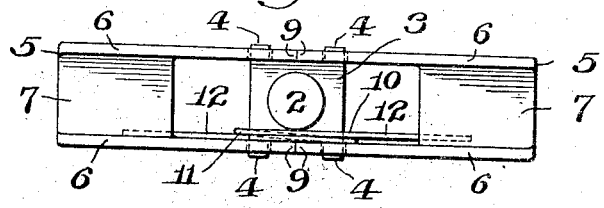
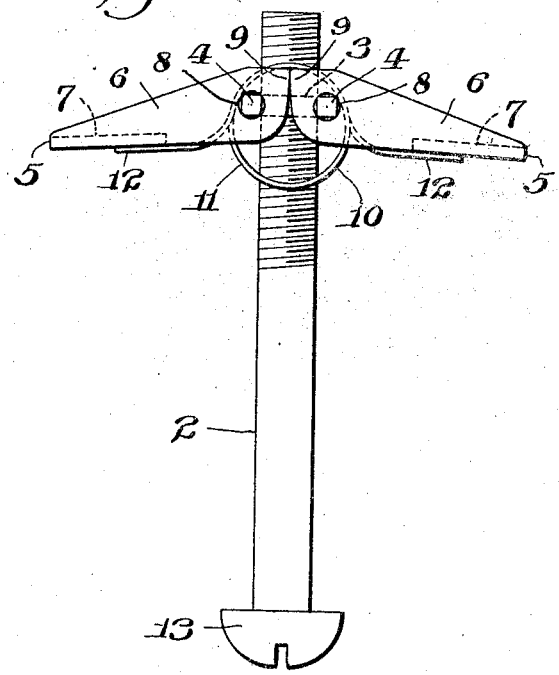
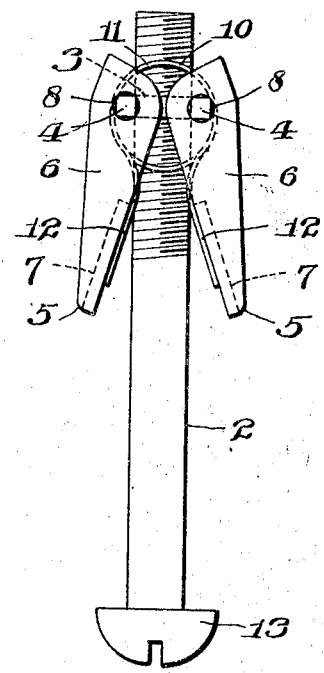
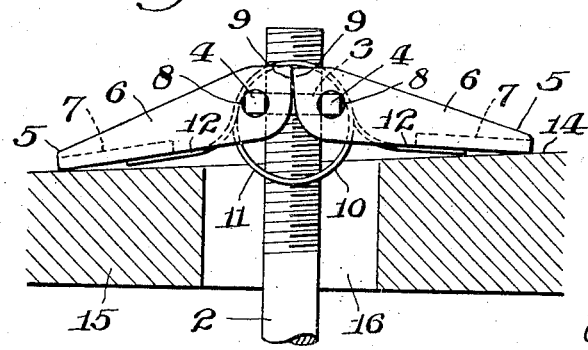
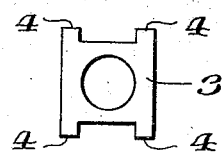
INVENTOR
Orson W. Brenizer Sept. 14, 1926.
O. W. BRENIZER
1,600,035
TOGGLE BOLT
Filed March 6, 1925    2 Sheets-Sheet 2
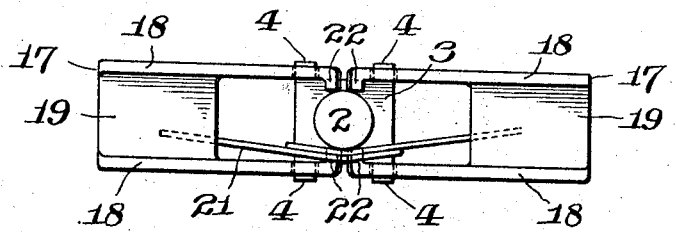
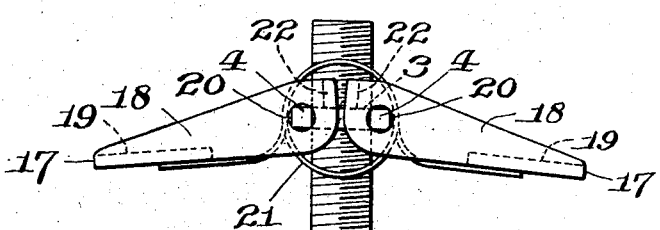
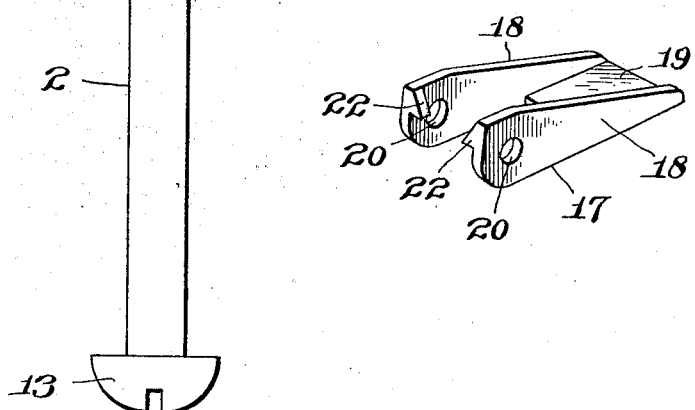
INVENTOR
Orson W. Brenizer Patented Sept. 14, 1926.

1,600,035

UNITED STATES PATENT OFFICE.

ORSON W. BRENIZER, OF PHILADELPHIA, PENNSYLVANIA, ASSIGNOR TO J. EDWARD OGDEN, OF MOUNTAINVILLE, NEW YORK.

TOGGLE BOLT.

Application filed March 6, 1925. Serial No. 13,500.

This invention relates to improvements in that class of toggle bolts wherein, as generally stated, two anchoring wings are pivoted on a head which is either in threaded engagement with the body of the bolt to act as a nut thereon or secured thereto or formed integral therewith and in which yielding means is provided to move the wings outwardly into an expanded or anchoring position.

The invention is characterized by the employment of two anchoring wings which are pivotally connected to the head on separate axes on opposite sides of the body of the bolt. One object of the invention is to provide a device of novel construction which may be manufactured at low cost and which will be efficient when in service. Another object of the invention is to so combine and arrange the parts of the device that the head will be in such threaded engagement with the body of the bolt proper that it may pass between the anchoring wings and through and beyond the head which carries them; and a further object of the invention is to so construct and arrange the anchoring wings that each may serve as a stop for the other to arrest its movement upon reaching the expanded or anchoring position in such manner that the wings will be in slidable engagement with each other and permit one to move relatively to the other when in the expanded position, so that the wings may accommodate themselves to uneven or angular opposing wall surfaces, and, at the same time, permit the body of the bolt to be set at different angles relatively to such surfaces.

Toggle bolts constructed in accordance with the invention are adapted to be used as a securing means for attaching objects to walls, ceilings and the like in cases where only one of two opposite surfaces of a wall is convenient of access, the wings being adapted to be passed through a hole in the wall and thereafter to prevent the withdrawal of the bolt from the hole, as will hereinafter more fully appear.

With the aforesaid and related objects in view, the invention consists of the elements and the combinations of them hereinafter described and claimed.

In the accompanying drawings, illustrating the invention, Figure 1 is a side view of a toggle bolt showing one form of embodiment of my invention with the anchoring wings in the open or expanded position.

Figure 2 is a side view thereof with the anchoring wings in the contracted position.

Figure 3 is a top view of the toggle bolt.

Figure 4 is a top view of the wing carrying head.

Figure 5 is a view of the parts shown in the upper portion of Fig. 1 showing the bolt within a hole in a wall and showing the anchoring wings adjusted into engagement with the uneven opposing surface of the wall while the body of the bolt remains in axial alinement with the hole.

Figures 6 and 7 are views similar to Figs. 1 and 3, but showing another form of embodiment of the invention.

Figure 8 is a perspective view of one of the anchoring wings shown in Figs. 6 and 7.

Referring to the drawings, 2 designates the body of the bolt or the bolt proper which I shall herein term the bolt, and 3 designates a wing carrying head which may be associated with the bolt 2 in any suitable manner. As herein illustrated, the bolt 2 is screw-threaded and the head 3 is provided with a central opening which is threaded to fit the threads of the bolt, and the head is screwed on to the bolt so that either the bolt or the head may be turned relatively to the other, and so that the head will act as a nut upon the bolt.

The head 3 is formed of an H-shaped punching of sheet metal providing two parallel pairs of trunnions 4, 4 and 4, 4 projecting outwardly from opposite sides of the body of the head.

I shall now describe the anchoring wings 5, 5 shown in Figs. 1, 2, 3, 4 and 5.

Each wing 5 is formed of a single piece or punching of sheet metal bent to form spaced, parallel side members 6, 6 and a connecting member 7. Each side member 6 is provided with alined holes or openings 8, and the members 5 are pivotally connected to the head 3 by means of the pairs of trunnions 4 which extend into the openings 8, so that the wings may swing on the trunnions 4 inwardly from the expanded position shown in Fig. 1 to the contracted position shown in Fig. 2, and back again or outwardly from the position shown in Fig. 2 to the position shown in Fig. 1.

The wings 5, 5 embrace the head 3, confining it between the side members 6 of the wings so that the opposing surfaces of the head and the embracing side members 6 prevent lateral displacement of the wings.

The side members 6 of one wing 5 are arranged opposite to and in alinement with the side members 6 of the other wing 5; and the inner opposing ends of the side members 6 above the head 3 are shaped as shown in the drawings to provide the abutting ends or surfaces 9 which are adapted to engage each other and arrest the outward movement of the wings 5 in the expanded position shown in Figs. 1 and 2.

The wings 5, 5 are held normally in the expanded position shown in Figs 1 and 5 by a spring 10 which is formed of wire and has its central portion bent to form a ring or loop 11 which surrounds the head 3 between one side of the bolt 2 and the inner surfaces of the adjacent opposing side members 6 of the wings 5 and which has its end portions formed into arms 12, 12 which extend outwardly beneath the wings and engage the bottoms thereof.

The spring arms 12 press the abutting ends or surfaces 9 of the side members 6 of the wings 5 against each other and hold the wings normally in the expanded position shown in Fig. 1, and permit the wings to be moved against the resilient action of the spring to or toward the contracted position shown in Fig. 2. After the wings have been moved to or toward the position shown in Fig. 2, and subsequently released, the spring 10 will automatically return the wings to the expanded position shown in Fig. 1.

It will now be understood that the end portion of the bolt carrying the wings 5 may be passed through a hole in a wall of less diameter than the space between the outer ends of the wings, and that as the wings are passed through the hole they will engage the wall thereof and be thereby moved toward or to the contracted position shown in Fig. 2 against the resilient action of the spring 10; and that, after the wings 5 clear the hole, they will be automatically expanded into the position shown in Fig. 1 in which they will engage the wall and prevent the withdrawal of the head 3 and wings 5 through the hole. This done the bolt 2 may be tightened by screwing it on through the head 3 to secure any desired object in place between the wall and the bolt head 13.

Should the surface of the wall opposing the wings 5 be uneven or inclined from a plane normal to the axis of the bolt 2, as shown in Fig. 5, where the opposing surface 14 of the wall 15 is inclined, the outer end portions of the wings 5 will be forced against the surface 14 while the bolt 2 is being tightened and while it remains in axial alinement with the hole 16 in the wall 15 or assumes any desired angle within limits relatively thereto, the abutting ends or surfaces 9 of the wings 5 sliding against each other and permitting the automatic adjustment of the wings 5.

In assembling the parts, the loop 11 of the spring 10 is first placed around the head 3. The wings 5 are then applied to the head 3 by entering a trunnion 4 into the hole 8 of one side member 6 of each wing and thereafter springing the side members of each wing apart and around the opposite trunnion 4 with the arms 12 of the spring 10 beneath the connecting members 7 of the wings. This done the bolt 2 is screwed into and through the head 3.

I shall now describe the anchoring wings 17, 17 shown in Figs. 6, 7 and 8.

Each wing 17 is formed of a single piece or punching of sheet metal bent to form spaced parallel side members 18 and a connecting member 19. Each side member 18 is provided with alined holes 20 and the members 18 are pivotally connected to the head 3 by means of the trunnions 4 similarly to the wings 5. A spring 21 is provided which acts to maintain the wings 17 yieldingly in the expanded position, similarly to the action of the spring 10 upon the wings 5.

Instead of having the outward movement of the wings 17 arrested by their engagement with each other as in the case of the wings 5, I provide the adjacent inner end portions of the side members 18 of each wing 17 with inwardly turned projections 22 arranged to engage the top of the head 3 to arrest the outward movement of the wings 17 in the expanded position shown in Fig. 6. In other respects the operation of the wings 17 is like the operation of the wings 5, excepting that, as the outward movement of the wings 17 is arrested by the head 3, the wings 17 cannot accommodate themselves, under pressure, to irregularities in opposing wall surfaces, as described with relation to the wings 5, when the bolt 2 is tightened in securing an object to a wall.

I claim as my invention:

1. The combination of a bolt, a head thereon, two anchoring wings each having a pair of side members embracing the head, the side members of one pair being arranged opposite to and in alinement with the side members of the other pair, the side members of the wings being pivotally connected to the head on separate axes on opposite sides of the bolt, yielding means to move the wings outwardly, and means to arrest the outward movement of the wings.

2. The combination of a bolt, a head thereon, two anchoring wings each having a pair of side members embracing the head the side members of one pair being arranged opposite to and in alinement with the side members of the other pair, the side members of the wings being pivotally connected to the head on separate axes on opposite sides of the bolt and the bolt being in threaded engagement with the head and adapted to pass freely through it and beween the wings, yielding means to move the wings outwardly, and means to arrest the outward movement of the wings.

3. The combination of a bolt, a head thereon formed of an H-shaped punching of sheet metal forming two pairs of trunnions on separate axes on opposite sides of the bolt, two anchoring wings pivotally carried by the pairs of trunnions, yielding means to move the wings outwardly, and means to arrest the outward movement of the wings.

4. The combination of a bolt, a head thereon formed of an H-shaped punching of sheet metal forming two pairs of trunnions on separate axes on opposite sides of the bolt, two anchoring wings pivotally carried by the pairs of trunnions, the bolt being in threaded engagement with the head and adapted to pass freely through it and between the wings, yielding means to move the wings outwardly, and means to arrest the outward movement of the wings.

5. The combination of a bolt, a head thereon formed of an H-shaped punching of sheet metal forming two pairs of trunnions on separate axes on opposite sides of the bolt, two anchoring wings pivotally carried by the pairs of trunnions, the bolt being in threaded engagement with the head and adapted to pass freely through it and between the wings and each wing being formed of a piece of sheet metal bent to form a connecting member and spaced side members embracing the head and having openings therein into which the trunnions of one pair thereof extend, yielding means to move the wings outwardly, and means to arrest the outward movement of the wings.

6. A wing carrying head for toggle bolts, formed of an H-shaped punching of sheet metal having a central opening to receive a bolt.

7. The combination of a bolt, a head thereon, two anchoring wings pivoted to the head on separate axes on opposite sides of the bolt and having parts adapted to engage each other to arrest the outward movement of the wings in anchoring position, and yielding means to move the wings outwardly.

8. The combination of a bolt, a head thereon, two anchoring wings pivotally connected to the head on separate axes on opposite sides of the bolt and having parts adapted to engage each other to arrest the outward movement of the wings in anchoring position and to slide against each other to permit relative adjustment of the wings while they are engaged with each other in anchoring position, and yielding means to move the wings outwardly.

9. The combination of a bolt, a head thereon, two anchoring wings each having a pair of side members embracing the head, the side members of the wings being pivotally connected to the head on separate axes on opposite sides of the bolt and the said side members having parts adapted to engage each other to arrest the outward movement of the wings when in anchoring position and to slide against each other to permit relative adjustment of the wings while they are engaged with each other in anchoring position, and yielding means to move the wings outwardly.

10. The combination of a bolt, a head thereon, two anchoring wings each of which is formed of a single piece of sheet metal bent to form side members and a connecting member, said wings embracing the head at opposite sides thereof and being pivotally connected to the head on separate axes at opposite sides of the bolt, the side members of one pair being arranged opposite to and in alinement with the side members of the other pair, one wing being wholly on one side and the other wing being wholly on the other side of a plane which extends through the axis of the bolt and parallel with the sides thereof, yielding means to move the wings outwardly, and means to arrest the outward movement of the wings.

In testimony whereof I affix my signature hereto.

ORSON W. BRENIZER.